United States Patent
Yamamoto

(10) Patent No.: US 10,970,812 B2
(45) Date of Patent: Apr. 6, 2021

(54) IMAGE PROCESSING DEVICE

(71) Applicant: AISIN SEIKI KABUSHIKI KAISHA, Kariya (JP)

(72) Inventor: Kinji Yamamoto, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/629,999

(22) PCT Filed: Mar. 5, 2018

(86) PCT No.: PCT/JP2018/008321
§ 371 (c)(1),
(2) Date: Jan. 10, 2020

(87) PCT Pub. No.: WO2019/053922
PCT Pub. Date: Mar. 21, 2019

(65) Prior Publication Data
US 2020/0134777 A1 Apr. 30, 2020

(30) Foreign Application Priority Data

Sep. 15, 2017 (JP) .............................. JP2017-177417

(51) Int. Cl.
*G06T 3/00* (2006.01)
*G06K 9/00* (2006.01)
(Continued)

(52) U.S. Cl.
CPC .......... *G06T 3/005* (2013.01); *G06K 9/00812* (2013.01); *G06T 3/40* (2013.01);
(Continued)

(58) Field of Classification Search
None
See application file for complete search history.

(56) References Cited

U.S. PATENT DOCUMENTS

| 7,161,616 B1 | 1/2007 | Okamoto et al. |
| 2013/0057690 A1* | 3/2013 | Mitsugi ................. G08G 1/168 |
| | | 348/148 |
| 2017/0324943 A1* | 11/2017 | Wu ..................... H04N 5/23238 |

FOREIGN PATENT DOCUMENTS

| JP | 3300334 B2 | 7/2002 |
| JP | 5292874 B2 | 9/2013 |
| JP | 2015-015527 A | 1/2015 |

OTHER PUBLICATIONS

International Search Report for PCT/JP2018/008321 dated May 29, 2018 (PCT/ISA/210).

* cited by examiner

*Primary Examiner* — Christopher Branifff
(74) *Attorney, Agent, or Firm* — Sughrue Mion, PLLC

(57) ABSTRACT

An image processing device according to an embodiment exemplarily includes, as an example: a processor that acquires a taken image obtained by imaging surroundings of a vehicle by an imaging unit mounted on the vehicle; projects the taken image to a stereoscopic projection plane including the vehicle and a first projection region rising above the vehicle and produces a composite image of the stereoscopic projection plane when viewed from a virtual viewpoint; causes a display to display the composite image; determines a target parking region in which the vehicle is parked in the stereoscopic projection plane; and shifts at least a part of a movement path of the vehicle from a position of the vehicle to the target parking region and the target parking region of the vehicle to a second projection region horizontal to the vehicle.

4 Claims, 13 Drawing Sheets

(51) Int. Cl.
*G06T 3/40* (2006.01)
*G06T 9/20* (2006.01)
*G06T 15/04* (2011.01)
*B60R 1/00* (2006.01)

(52) U.S. Cl.
CPC .............. *G06T 15/04* (2013.01); *B60R 1/002* (2013.01); *B60R 2300/105* (2013.01); *B60R 2300/207* (2013.01); *B60R 2300/303* (2013.01)

ENLARGE PLANAR SURFACE PROJECTION REGION

SHIFT TARGET PARKING REGION TO
PLANAR SURFACE PROJECTION REGION

IMAGE PROCESSING DEVICE

CROSS REFERENCE TO RELATED APPLICATIONS

This application is National Stage application of International Application No. PCT/JP2018/008321, filed Mar. 5, 2018, which designates the United States, incorporated herein by reference, and which claims the benefit of priority from Japanese Patent Application No. 2017-177417, filed Sep. 15, 2017, the entire contents of which are incorporated herein by reference.

TECHNICAL FIELD

The present invention relates to an image processing device.

BACKGROUND ART

Techniques have been developed that project a taken image obtained by imaging surroundings of a vehicle on a three-dimensional projection plane and display a composite image of the three-dimensional projection plane to which the taken image is projected when viewed from a virtual viewpoint.

CITATION LIST

Patent Literature

Patent Document 1: Japanese Patent No. 5292874
Patent Document 2: Japanese Patent No. 3300334

SUMMARY OF INVENTION

Problem to be Solved by the Invention

When a flat projection plane including a vehicle in the three-dimensional projection plane is narrow, a parking region present around the vehicle is not projected to the flat projection plane, thereby causing a parking frame that makes it possible to identify the parking region to be distorted. On the other hand, when the flat projection plane is too wide, an obstacle at a position far from the vehicle is projected to the flat projection plane, thereby causing the obstacle to be distorted. As a result, the composite image different from a natural image is displayed.

Means for Solving Problem

An image processing device of an embodiment includes, for example: a processor that acquires a taken image obtained by imaging surroundings of a vehicle by an imaging unit mounted on the vehicle; projects the taken image to a stereoscopic projection plane including the vehicle and a first projection region rising above the vehicle; produces a composite image of the stereoscopic projection plane when viewed from a virtual viewpoint; causes a display to display the composite image; that determines a target parking region in which the vehicle is parked in the stereoscopic projection plane; and shifts at least a part of a movement path of the vehicle from a position of the vehicle to the target parking region and the target parking region of the vehicle to a second projection region horizontal to the vehicle. The image processing device in the embodiment, thus, can display the composite image in which the target parking region of the vehicle is visually recognized naturally, for example.

In the image processing device of the embodiments, wherein, the first projection region is positioned around the second projection region, the second projection region includes the vehicle, and the processor enlarges the second projection region as a whole such that an end on a far side of the target parking region when viewed from the position of the vehicle is included in the second projection region. The image processing device in the embodiment, thus, can display the composite image in which the target parking region of the vehicle is visually recognized naturally, for example.

In the image processing device of the embodiments, wherein the processor partially enlarges the second projection region such that only at least a part of the target parking region and the movement path in the first projection region is included in the second projection region. The image processing device in the embodiment, thus, can display the composite image in which the target parking region of the vehicle and an obstacle around the target parking region are visually recognized naturally, for example.

In the image processing device of the embodiments, wherein, the first projection region is positioned around the second projection region, the second projection region includes the vehicle, and the processor enlarges the second projection region such that an end on a far side of the target parking region when viewed from the position of the vehicle is included in the second projection region when an obstacle is absent around the target parking region, and partially enlarges the second projection region such that only a part of the target parking region and the movement path in the first projection region is included in the second projection region when an obstacle is present around the target parking region. The image processing device in the embodiment, thus, can display the composite image in which the target parking region and the surroundings of the target parking region are visually recognized naturally, even when the target parking position and a surrounding environment of the vehicle are changed, for example.

In the image processing device of the embodiments, further comprising: a storage that stores therein a first map associating coordinates in the stereoscopic projection plane with texture coordinates of the taken image projected to the coordinates and a second map associating coordinates in a planar surface projection plane, the planar surface projection plane being composed of a single projection plane horizontal to the vehicle, with the texture coordinates projected to the coordinates, wherein the processor that, when the target parking region is decided, overwrites a map associating coordinates of the movement path in the second projection region with the texture coordinates of the taken image projected to the coordinates, the map being included in the first map, with the second map associating coordinates of the movement path in the planar surface projection plane with the texture coordinates of the taken image projected to the coordinates, and projects the taken image to the stereoscopic projection plane in accordance with the first map. The image processing device in the embodiment, thus, can accelerate display processing of the composite image.

DESCRIPTION OF EMBODIMENTS

The following discloses exemplary embodiments of the invention. The structures of the following embodiments and operations, results, and effects brought by the structures are examples. The invention can be achieved by structures other than those disclosed by the following embodiments and the structures can obtain at least one of various effects based on the basic structures and derivative effects.

The vehicle on which an image processing device according to the embodiments is mounted may be an automobile (internal combustion engine automobile) having an internal combustion engine as its drive source, an automobile (electric automobile, fuel battery automobile, or the like) having an electric motor (motor) as its drive source, or an automobile (hybrid automobile) having both the internal combustion engine and the electric motor as its drive source. On the vehicle, various speed changing devices and various devices (systems, parts, and the like) necessary for driving the internal combustion engine and the electronic motor can also be mounted. The systems, the number, and the layout of devices for driving wheels can be set in various manners in the vehicle.

First Embodiment

Figure 1:
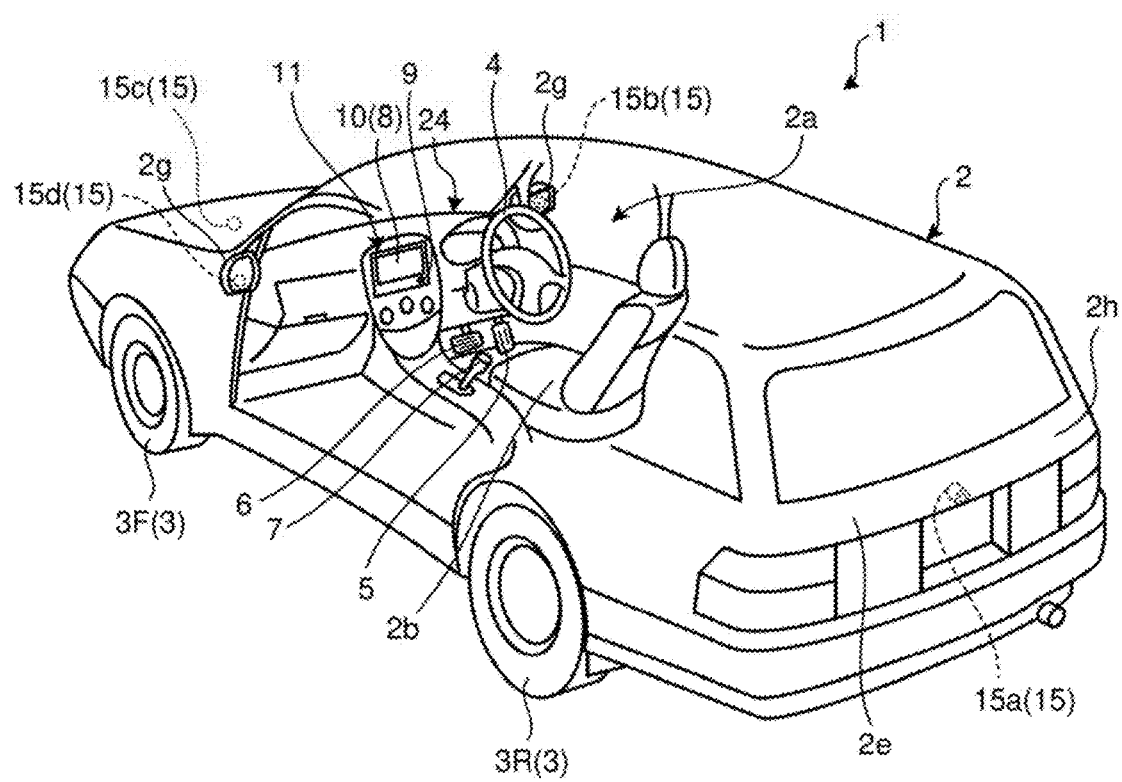
FIG. 1 is a perspective view illustrating an exemplary state where a part of a cabin of a vehicle on which an image processing device according to a first embodiment is mounted is viewed in a perspective manner.

FIG. 1 is a perspective view illustrating an exemplary state where a part of a cabin of a vehicle on which an image processing device according to a first embodiment is mounted is viewed in a perspective manner. As illustrated in FIG. 1, a vehicle 1 includes a vehicle body 2, a steering unit 4, an accelerating operation unit 5, a braking operation unit 6, a speed shifting operation unit 7, and a monitoring device 11. The vehicle body 2 has a vehicle cabin 2a in which occupants sit. In the vehicle cabin 2a, the steering unit 4, the accelerating operation unit 5, the braking operation unit 6, and the speed shifting operation unit 7, for example, are provided such that a driver who is the occupant and sits on a seat 2b faces them. The steering unit 4 is a steering wheel protruding from a dashboard 24, for example. The accelerating operation unit 5 is an accelerator pedal positioned near the place where the driver's foot naturally rests, for example. The braking operation unit 6 is a brake pedal positioned near the place where the driver's foot naturally rests, for example. The speed shifting operation unit 7 is a shift lever protruding from a center console, for example.

The monitoring device 11 is provided to the central portion in a vehicle width direction (i.e., left-right direction) of the dashboard 24, for example. The monitoring device 11 may have a function of a navigation system or an audio system, for example. The monitoring device 11 has a display 8, a voice output device 9, and an operation input unit 10. The monitoring device 11 may have various operation input units such as a switch, a dial, a joystick, and a push button.

The display 8 includes a liquid crystal display (LCD) or an organic electroluminescent display (OELD), for example, and can display various images on the basis of image data. The voice output device 9 includes a speaker, for example, and outputs various voices on the basis of voice data. The voice output device 9 may be provided at a position different from that of the monitoring device 11 in the vehicle cabin 2a.

The operation input unit 10 includes a touch panel, for example, and allows the occupant to input various types of information to it. The operation input unit 10 is provided on a display screen of the display 8 and allows the image displayed on the display 8 to pass through the operation input unit 10. The operation input unit 10, thus, allows the occupant to visually recognize the image displayed on the display screen of the display 8. The operation input unit 10 detects the occupant's touch operation on the display screen of the display 8, thereby receiving various types of information input by the occupant.

Figure 2:
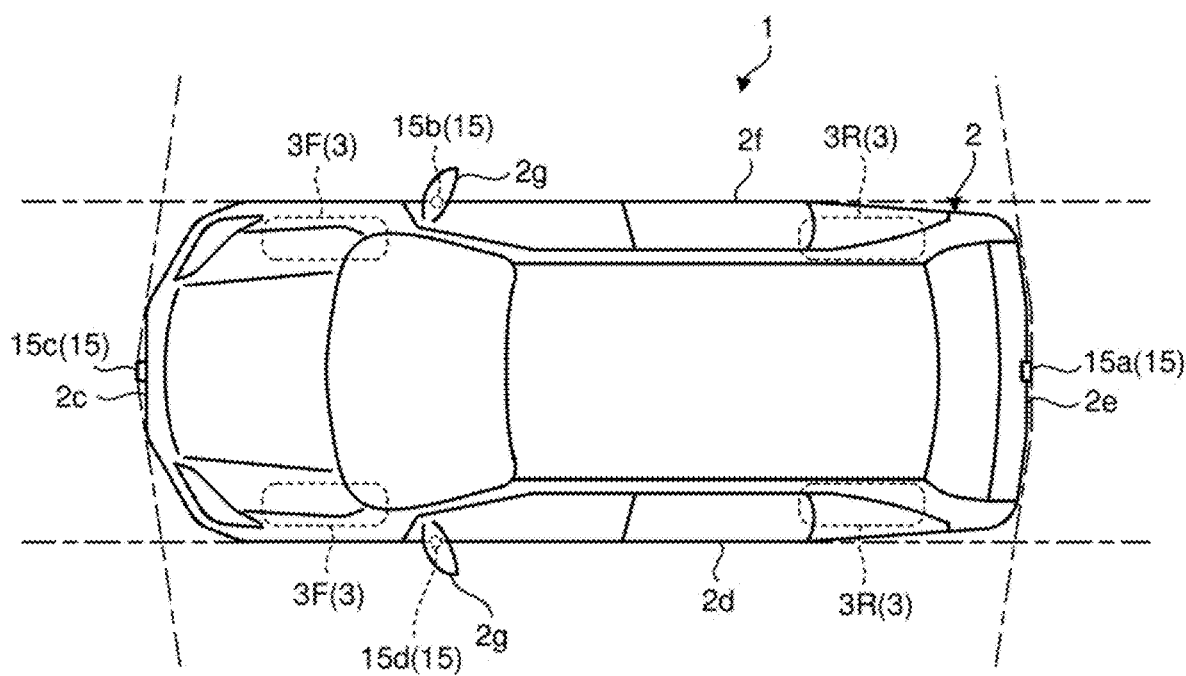
FIG. 2 is an exemplary plan view of the vehicle according to the first embodiment.

FIG. 2 is an exemplary plan view of the vehicle according to the first embodiment. As illustrated in FIGS. 1 and 2, the vehicle 1 is a four-wheel automobile, for example, and has two front wheels 3F on the left and the right sides and two rear wheels 3R on the left and the right sides. All or a part of the four wheels 3 can be steered.

The vehicle 1 includes a plurality of imaging units 15 mounted thereon. In the embodiment, four imaging units 15a to 15d are mounted on the vehicle 1, for example. The imaging unit 15 is a digital camera having an imaging element such as a charge coupled device (CCD) or a CMOS image sensor (CIS). The imaging unit 15 can image surroundings of the vehicle 1 at a certain frame rate. The imaging unit 15 outputs the taken image obtained by imaging the surroundings of the vehicle 1. The imaging unit 15 has a wide-angle lens or a fish-eye lens and can image a range from 140 degrees to 220 degrees in the horizontal direction, for example. Optical axes of the imaging units 15 are set obliquely downward in some cases.

Specifically, the imaging unit 15a is positioned at an end portion 2e on the rear side of the vehicle body 2 and provided on the wall portion on the lower side of a rear window of a door 2h of a rear hatch, for example. The imaging unit 15a can image a rear region of the vehicle 1 in the surroundings of the vehicle 1. The imaging unit 15b is positioned at an end portion 2f on the right side of the vehicle body 2 and provided to a door mirror 2g on the right side, for example. The imaging unit 15b can image a side region of the vehicle 1 in the surroundings of the vehicle 1. The imaging unit 15c is positioned at an end portion 2c on the front side of the vehicle body 2, i.e., on the front direction side in the front-rear direction of the vehicle 1, and provided to a front bumper or a front grill, for example. The imaging unit 15c can image a front region of the vehicle 1 in the surroundings of the vehicle 1. The imaging unit 15d is positioned on the left side of the vehicle body 2, i.e., at an end portion 2d on the left side in the vehicle width direction, and provided to a door mirror 2g on the left side. The imaging unit 15d can image a side region of the vehicle 1 in the surroundings of the vehicle 1.

Figure 3:
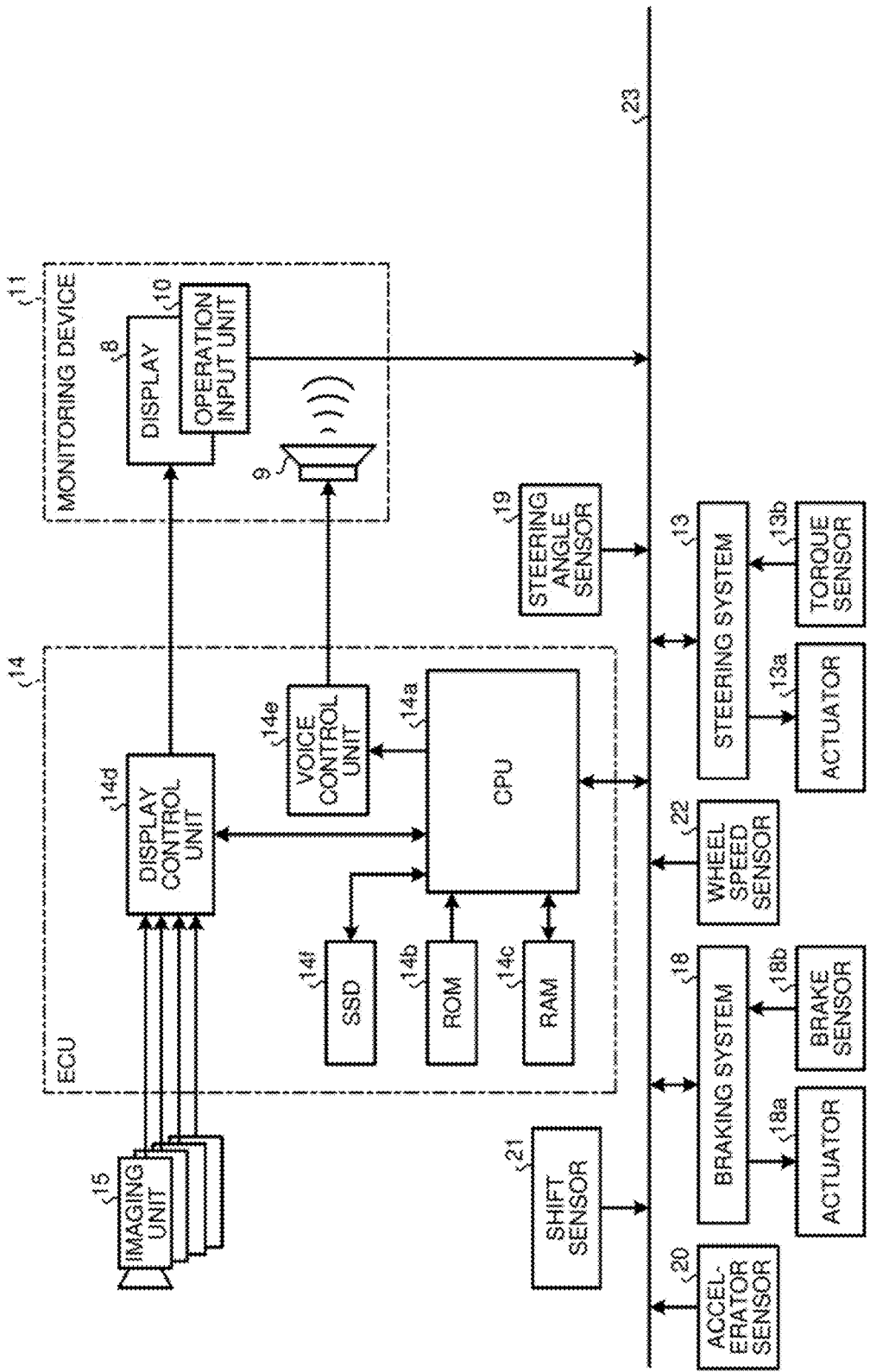
FIG. 3 is a block diagram illustrating an exemplary functional structure of the vehicle according to the first embodiment.

FIG. 3 is a block diagram illustrating an exemplary functional structure of the vehicle according to the first embodiment. As illustrated in FIG. 3, the vehicle 1 includes a steering system 13, a braking system 18, a steering angle sensor 19, an accelerator sensor 20, a shift sensor 21, a wheel speed sensor 22, an in-vehicle network 23, and an electronic control unit (ECU) 14. The monitoring device 11, the steering system 13, the braking system 18, the steering angle sensor 19, the accelerator sensor 20, the shift sensor 21, the wheel speed sensor 22, and the ECU 14 are electrically coupled with the in-vehicle network 23 serving as an electrical communication line. The in-vehicle network 23 is a controller area network (CAN), for example.

The steering system 13 is an electric power steering system or a steer by wire (SBW) system, for example. The steering system 13 has an actuator 13a and a torque sensor 13b. The steering system 13, which is electrically controlled by the ECU 14, for example, applies torque to the steering unit 4 so as to add steering force to the steering unit 4 by operating the actuator 13a, thereby steering the wheels 3. The torque sensor 13b detects torque applied to the steering unit 4 by the driver and transmits the detection result to the ECU 14.

The braking system 18 includes an anti-lock brake system (ABS) that controls locking up during braking in the vehicle 1, an electronic stability control (ESC) that prevents skidding of the vehicle 1 in cornering, an electric braking system that increases braking force to assist the brake operation, and a brake by wire (BBW). The braking system 18 has an actuator 18a and a brake sensor 18b. The braking system 18, which is electrically controlled by the ECU 14, for example, applies braking force to the wheels 3 via the actuator 18a. The braking system 18 detects indications of locking up of the brake, idling of the wheels 3, and the skidding, for example, from a difference in rotation between the wheels 3 on the right side and on the left side, for example, and performs control so as to prevent the locking up of the brake, the idling of the wheels 3, and the skidding. The brake sensor 18b is a displacement sensor that detects the position of the brake pedal serving as a movable unit of the braking operation unit 6, and transmits the detection result of the position of the brake pedal to the ECU 14.

The steering angle sensor 19 detects a steering amount of the steering unit 4 such as a steering wheel. In the embodiment, the steering angle sensor 19 includes a hall element, for example, detects a rotation angle of the rotating portion of the steering unit 4 as the steering amount, and transmits the detection result to the ECU 14. The accelerator sensor 20 is a displacement sensor that detects the position of the accelerator pedal serving as the movable unit of the accelerating operation unit 5, and transmits the detection result to the ECU 14.

The shift sensor 21 detects the position of the movable units (e.g., a bar, an arm, and a button) of the speed shifting operation unit 7 and transmits the detection result to the ECU 14. The wheel speed sensor 22 has hall elements, for example, detects rotation amounts of the wheels 3 and the number of rotations of wheels 3 per unit time, and transmits the detection result to the ECU 14.

The ECU 14 functions as an example of the image processing device that projects the taken image obtained by imaging the surroundings of the vehicle 1 by the imaging unit 15 to a preliminarily set projection plane, produces an image of the projection plane when viewed from a virtual viewpoint, and causes the display 8 to display the produced image. The ECU 14 is a computer, for example. The ECU 14 manages the whole control of the vehicle 1 by cooperation of hardware and software. Specifically, the ECU 14 includes a central processing unit (CPU) 14a, a read only memory (ROM) 14b, a random access memory (RAM) 14c, a display control unit 14d, a voice control unit 14e, and a solid state drive (SSD) 14f. The CPU 14a, the ROM 14b, and the RAM 14c may be provided in the same circuit substrate.

The CPU 14a reads out a program stored in a nonvolatile storage device such as the ROM 14b and executes various types of arithmetic processing in accordance with the program. For example, the CPU 14a performs image processing on image data that the CPU 14a causes the display 8 to display.

The ROM 14b stores therein various programs and parameters necessary for executing the programs, for example. The RAM 14c temporarily stores therein various types of data used for arithmetic operation by the CPU 14a. The display control unit 14d performs mainly the image processing on the image data that is acquired from the imaging unit 15 and output to the CPU 14a, and conversion from the image data acquired from the CPU 14a to the display image data that the imaging unit 15 causes the display 8 to display, out of the arithmetic processing by the ECU 14, for example. The voice control unit 14e mainly performs processing on a voice that is acquired from the CPU 14a and the voice control unit 14e causes the voice output device 9 to output, out of the arithmetic processing by the ECU 14. The SSD 14f, which is a writable nonvolatile storage unit, continues to store therein the data acquired from the CPU 14a even when the power source of the ECU 14 is turned off.

Figure 4:
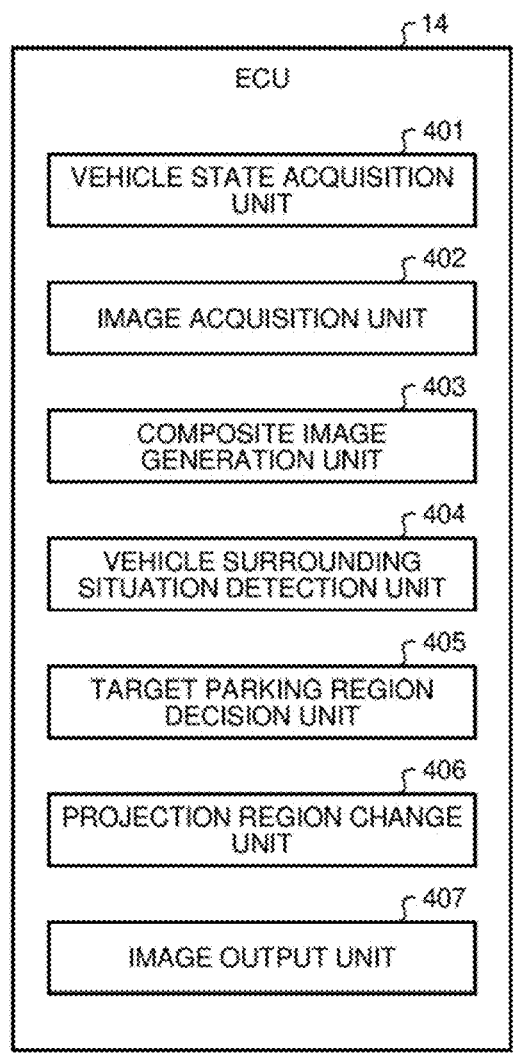
FIG. 4 is a block diagram illustrating an exemplary functional structure of an ECU included in the vehicle according to the first embodiment.

FIG. 4 is a block diagram illustrating an exemplary functional structure of the ECU included in the vehicle according to the first embodiment. As illustrated in FIG. 4, the ECU 14 includes a vehicle state acquisition unit 401, an image acquisition unit 402, a composite image generation unit 403, a vehicle surrounding situation detection unit 404, a target parking region decision unit 405, a projection region change unit 406, and an image output unit 407. For example, the processor such as the CPU 14a mounted on the circuit substrate executes a surroundings monitoring program stored in the storage medium such as the ROM 14b or the SSD 14f. As a result, the ECU 14 achieves the functions of the vehicle state acquisition unit 401, the image acquisition unit 402, the composite image generation unit 403, the vehicle surrounding situation detection unit 404, the target parking region decision unit 405, the projection region change unit 406, and the image output unit 407. A part or all of the vehicle state acquisition unit 401, the image acquisition unit 402, the composite image generation unit 403, the vehicle surrounding situation detection unit 404, the target parking region decision unit 405, the projection region change unit 406, and the image output unit 407 may be structured by hardware such as a circuit.

The vehicle state acquisition unit 401 acquires the state of the vehicle 1 such as the steering amount of the steering unit 4 detected by the steering angle sensor 19, the position of the accelerator pedal detected by the accelerator sensor 20, the position of the movable unit of the speed shifting operation unit 7 detected by the shift sensor 21, and the number of rotations of the wheels 3 detected by the wheel speed sensor 22. The image acquisition unit 402 acquires, from the imaging unit 15, the taken image obtained by imaging the surroundings of the vehicle 1 by the imaging unit 15.

The composite image generation unit 403 projects the taken image acquired by the image acquisition unit 402 to a three-dimensional projection plane (hereinafter, described as a stereoscopic projection plane). The stereoscopic projection plane is a projection plane that includes the vehicle 1 and a projection region (hereinafter, described as a stereoscopic projection region) rising above the vehicle 1. In the embodiment, the stereoscopic projection plane has a projection region horizontal to the vehicle 1 (hereinafter, described as a planar surface projection region) and the stereoscopic projection region positioned around the planar surface projection region. The composite image generation unit 403 projects the taken image to the stereoscopic projection plane and produces an image of the stereoscopic projection plane to which the taken image is projected when viewed from the virtual viewpoint (hereinafter, the image is described as a composite image).

The vehicle surrounding situation detection unit 404 detects, on the basis of the taken image acquired by the image acquisition unit 402, for example, the surrounding situation of the vehicle 1 such as a target parking position that is the position at which the vehicle 1 is parked and an obstacle present around the vehicle 1. The target parking region decision unit 405 determines a target parking region in which the vehicle 1 is parked in the stereoscopic projection plane. The target parking region corresponds to the target parking position detected by the vehicle surrounding situation detection unit 404 in the stereoscopic projection plane. Specifically, the target parking region is the region to which the taken image of the target parking position (taken image obtained by imaging the target parking position of the vehicle 1 by the imaging unit 15) is projected in the stereoscopic projection plane.

The image output unit 407 functions as an example of the display control unit that outputs the composite image produced by the composite image generation unit 403 to the display 8 to cause the display 8 to display the composite image. The projection region change unit 406 shifts at least a part of a movement path and the target parking region of the vehicle 1 in the stereoscopic projection region to the planar surface projection region. The movement path is a path along which the vehicle 1 moves from its position to the target parking region. As a result of the shift, the taken image of the movement path of the vehicle 1 is projected to a flat projection plane, thereby making it possible to prevent the target parking region (e.g., a parking frame) of the vehicle 1 from being distorted in the stereoscopic projection plane or not being projected to the stereoscopic projection plane. As a result, the composite image can be displayed in which the target parking region of the vehicle 1 can be visually recognized naturally.

Figure 5:
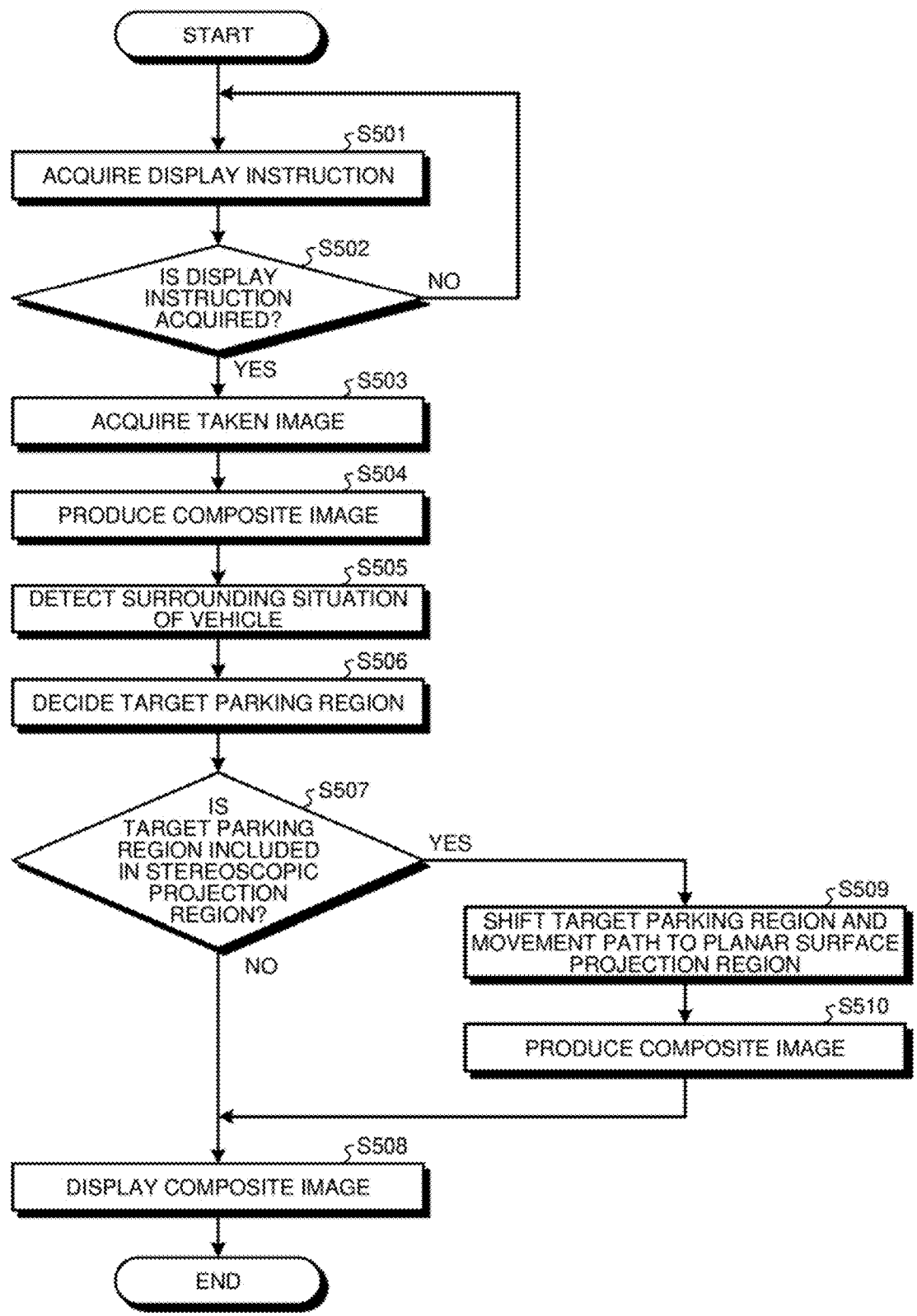
FIG. 5 is a flowchart illustrating an exemplary flow of display processing of the composite image by the ECU included in the vehicle according to the first embodiment.

The following describes an exemplary flow of display processing of the composite image by the ECU 14 included in the vehicle 1 according to the embodiment with reference to FIG. 5. FIG. 5 is a flowchart illustrating an exemplary flow of the display processing of the composite image by the ECU included in the vehicle according to the first embodiment.

In the embodiment, the image acquisition unit 402 acquires, from the operation input unit 10, for example, a display instruction that instructs display of the composite image (step S501). If the display instruction is received (Yes at step S502), the image acquisition unit 402 acquires, from the imaging unit 15, the taken image obtained by imaging the surroundings of the vehicle 1 by the imaging unit 15 (step S503). For example, the image acquisition unit 402 acquires, at the current position of the vehicle 1, the taken image obtained by imaging the surroundings of the vehicle 1 by the imaging unit 15.

The composite image generation unit 403 projects the acquired taken image to the stereoscopic projection plane and produces the composite image of the stereoscopic projection plane when viewed from the preliminarily set virtual viewpoint (step S504). In the embodiment, the composite image generation unit 403 converts respective coordinates (hereinafter, described as texture coordinates) in the acquired taken image into the coordinates in the stereoscopic projection plane by projection conversion. The composite image generation unit 403 projects the images at the respective texture coordinates in the acquired taken image to the positions represented by the coordinates converted from the texture coordinates by the projection conversion. The composite image generation unit 403, thus, projects the taken image to the stereoscopic projection plane.

The vehicle surrounding situation detection unit 404 detects the surrounding situation of the vehicle 1 such as the target parking position on the basis of the taken image acquired by the image acquisition unit 402, for example (step S505). The target parking region decision unit 405 determines, in the stereoscopic projection plane, the target parking region corresponding to the target parking position detected by the vehicle surrounding situation detection unit 404 (step S506). The composite image generation unit 403 determines whether the determined target parking region is included in the stereoscopic projection region (step S507). If the determined target parking region is not included in the stereoscopic projection region (No at step S507), the image output unit 407 causes the display 8 to display the composite image produced by the composite image generation unit 403 (step S508).

If the determined target parking region is included in the stereoscopic projection region (Yes at step S507), the composite image generation unit 403 shifts the movement path and the target parking region of the vehicle 1 in the stereoscopic projection region to the planar surface projection region (step S509). The composite image generation unit 403 again projects the taken image to the stereoscopic projection plane after the stereoscopic projection region is changed and produces the composite image of the stereoscopic projection plane to which the taken image is again projected when viewed from the virtual viewpoint (step S510). Thereafter, the image output unit 407 causes the display 8 to display the composite image produced by the composite image generation unit 403 (step S508).

Figure 6:
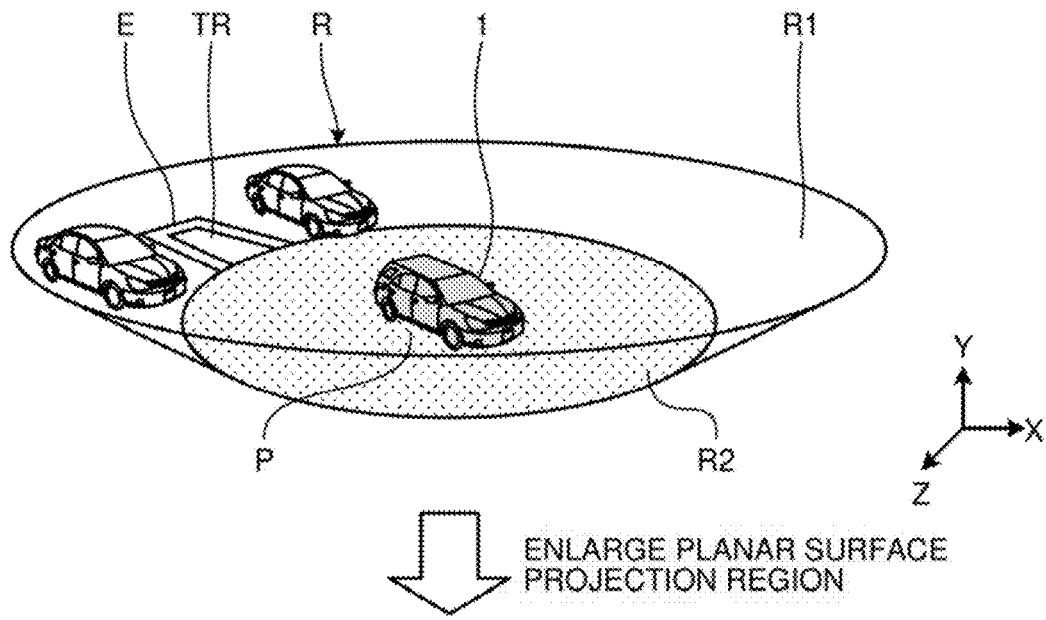
FIG. 6 is a diagram for explaining exemplary change processing of a stereoscopic projection plane by the ECU included in the vehicle according to the first embodiment.
Figure 6:
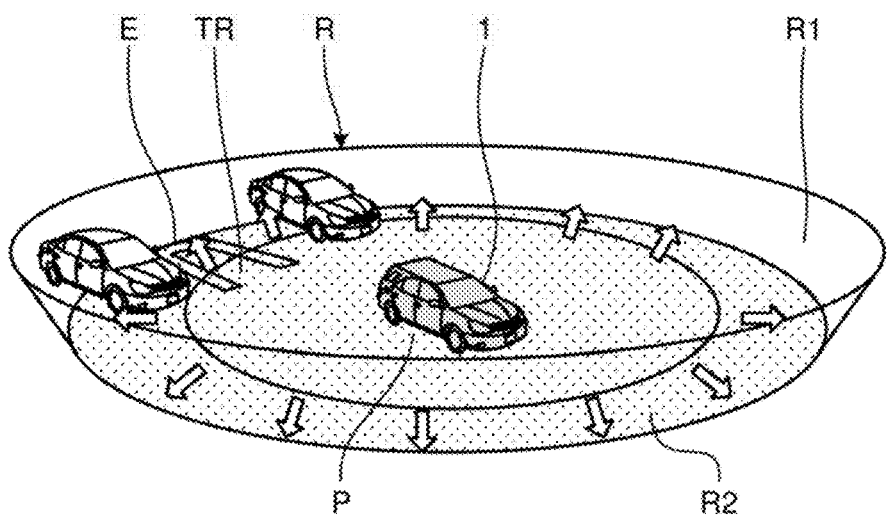

The following describes an exemplary change processing of the stereoscopic projection plane by the ECU 14 included in the vehicle 1 according to the embodiment with reference to FIG. 6. FIG. 6 is a diagram for explaining the exemplary change processing of the stereoscopic projection plane by the ECU included in the vehicle according to the first embodiment. In FIG. 6, a direction that is parallel to a planar surface projection region R2 is defined as a Z direction, a direction that is parallel to the planar surface projection region R2 and perpendicular to the Z direction is defined as an X direction, and a direction that is vertical to the planar surface projection region R2 is defined as a Y direction.

For example, as illustrated in FIG. 6, the composite image generation unit 403 preliminarily produces a stereoscopic projection plane R including the planar surface projection region R2 and a stereoscopic projection region R1. The planar surface projection region R2 is a flat projection region having a circular shape (e.g., circle or ellipse) with a position P of the vehicle 1 as a center. In the embodiment, the planar surface projection region R2 is a circular projection region. The shape is not limited to this shape. For example, the planar surface projection region R2 may be a flat projection region having a polygonal shape. The stereoscopic projection region R1 is a projection region that gradually rises from the end (outer edge) of the planar surface projection region R2 serving as a reference in the Y direction (above the planar surface projection region R2) as it goes away from the planar surface projection region R2. Specifically, the stereoscopic projection region R1 is a curved surface that rises from the outer edge of the planar surface projection region R2 in the Y direction in an elliptic shape or a parabolic shape. The composite image generation unit 403 produces, as the stereoscopic projection plane R, a three-dimensional surface that has a bowl-like shape and includes the position P of the vehicle 1. Thereafter, the composite image generation unit 403 projects the taken image acquired by the image acquisition unit 402 to the produced stereoscopic projection plane R.

The vehicle surrounding situation detection unit 404 detects the target parking position of the vehicle 1 on the basis of the taken image acquired by the image acquisition unit 402, for example. As illustrated in FIG. 6, the target parking region decision unit 405 determines a target parking region TR corresponding to the target parking position detected by the vehicle surrounding situation detection unit 404 in the stereoscopic projection plane R. As illustrated in FIG. 6, when the determined target parking region TR is included in the stereoscopic projection region R1, the projection region change unit 406 increases a radius of the planar surface projection region R2 such that an end E on the far side of the target parking region TR when viewed from the position P of the vehicle 1 in the stereoscopic projection region R1 is included in the planar surface projection region R2. In the embodiment, the projection region change unit 406 increases the radius of the planar surface projection region R2 so as to include the end E on the far side of the target parking region TR when viewed from the position P of the vehicle 1 in the planar surface projection region R2. The end E on the far side of the target parking region TR when viewed from the position P of the vehicle 1 is not limited to being included in the planar surface projection region R2 in the manner described above. The end E is included in the planar surface projection region R2 in any manner to increase (enlarge) the planar surface projection region R2 as a whole.

This change makes it possible to project the taken image of the movement path and the target parking region TR of the vehicle 1 to the flat planar surface projection region R2. This, thus, can prevent the image (e.g., the parking frame) that makes it possible to identify the target parking position of the vehicle 1 from being distorted in the stereoscopic projection plane R or not being projected to the stereoscopic projection plane R. As a result, the composite image can be displayed in which the target parking region TR of the vehicle 1 is visually recognized naturally.

Figure 7:
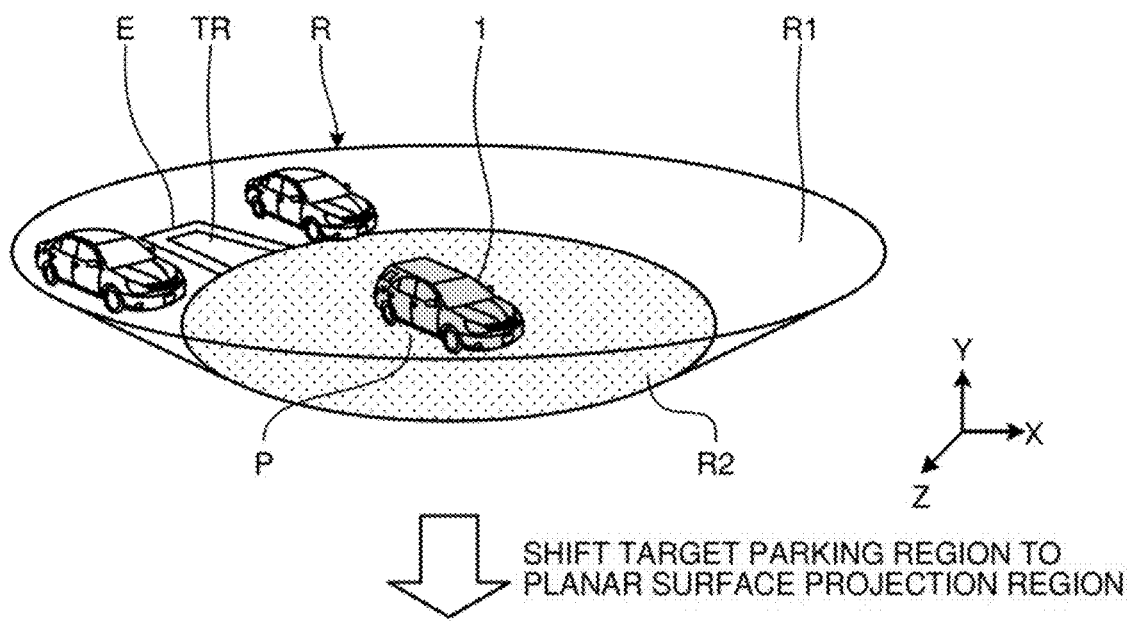
FIG. 7 is a diagram for explaining other exemplary change processing of the stereoscopic projection plane by the ECU included in the vehicle according to the first embodiment.
Figure 7:
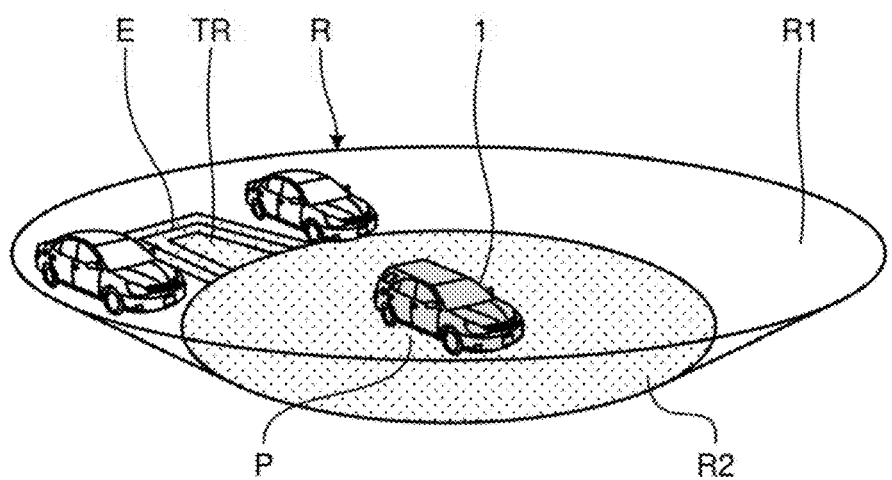

The following describes other exemplary change processing of the stereoscopic projection plane by the ECU 14 included in the vehicle 1 according to the embodiment with reference to FIG. 7. FIG. 7 is a diagram for explaining other exemplary change processing of the stereoscopic projection plane by the ECU included in the vehicle according to the first embodiment. In FIG. 7, a direction that is parallel to the planar surface projection region R2 is defined as the Z direction, a direction that is parallel to the planar surface projection region R2 and perpendicular to the Z direction is defined as the X direction, and a direction that is vertical to the planar surface projection region R2 is defined as the Y direction.

For example, as illustrated in FIG. 7, the composite image generation unit 403 projects the taken image acquired by the image acquisition unit 402 to the preliminarily produced stereoscopic projection plane R in the same manner as described with reference to FIG. 6. The vehicle surrounding situation detection unit 404 detects the target parking position of the vehicle 1 on the basis of the taken image acquired by the image acquisition unit 402, for example. As illustrated in FIG. 7, the target parking region decision unit 405 determines the target parking region TR corresponding to the target parking position detected by the vehicle surrounding situation detection unit 404 in the stereoscopic projection plane R.

As illustrated in FIG. 7, when the decided target parking region TR is included in the stereoscopic projection region R1, the projection region change unit 406 partially increases (enlarges) the planar surface projection region R2 such that only the target parking region TR in the stereoscopic projection region R1 is included in the planar surface projection region R2. In other words, as illustrated in FIG. 7, when the decided target parking region TR is included in the stereoscopic projection region R1, the projection region change unit 406 enlarges the planar surface projection region R2 such that the target parking region TR is included in the planar surface projection region R2 while the region other than the target parking region TR in the stereoscopic projection region R1 remains in the stereoscopic projection region R1.

When a three-dimensional object such as another vehicle is present in a region adjacent to the target parking region TR, the change described above makes it possible to project the taken image of the three-dimensional object that is projected to the region adjacent to the target parking region TR to the stereoscopic projection region R1 while the taken image of the target parking region TR is projected to the flat planar surface projection region R2. The image of the obstacle projected to the stereoscopic projection plane R, thus, does not become an elongated image, thereby making it possible to prevent the target parking region TR (e.g., parking frame) of the vehicle 1 from being distorted. As a result, the composite image can be displayed in which the target parking region TR of the vehicle 1 and the obstacle around the target parking region TR are visually recognized naturally. In the embodiment, the projection region change unit 406 shifts the whole of the target parking region TR in the stereoscopic projection region R1 to the planar surface projection region R2. The planar surface projection region R2 can be enlarged in any manner satisfying that only at least a part of the target parking region TR and the movement path in the stereoscopic projection region R1 is included in the planar surface projection region R2.

The projection region change unit 406 can switch the methods for changing the stereoscopic projection region R1 to the planar surface projection region R2 in accordance with whether an obstacle is present around the decided target parking region TR. Specifically, when no obstacle is present around the target parking region TR, the projection region change unit 406 enlarges the planar surface projection region R2 such that the end E on the far side of the target parking region TR when viewed from the position P of the vehicle 1 is included in the planar surface projection region R2. When an obstacle is present around the target parking region TR, the projection region change unit 406 enlarges the planar surface projection region R2 such that only at least a part of the target parking region TR and the movement path in the stereoscopic projection region R1 is included in the planar surface projection region R2. As a result, the composite image can be displayed in which the target parking region TR and the surroundings of the target parking region TR are visually recognized naturally even when an environment around the target parking position of the vehicle 1 is changed.

When a region far from (ahead) the target parking region TR when viewed from the vehicle 1 is included in the planar surface projection region R2 in the stereoscopic projection plane R, the projection region change unit 406 can reduce the planar surface projection region R2. Specifically, the projection region change unit 406 reduces the planar surface projection region R2 such that the end E on the far side of the target parking region TR when viewed from the vehicle 1 coincides with the end of the planar surface projection region R2 in the stereoscopic projection plane R. This reduction makes it possible to project the region far from the target parking region TR to the stereoscopic projection region R1 while the taken image of the target parking region TR is projected to the planar surface projection region R2.

Figure 8:
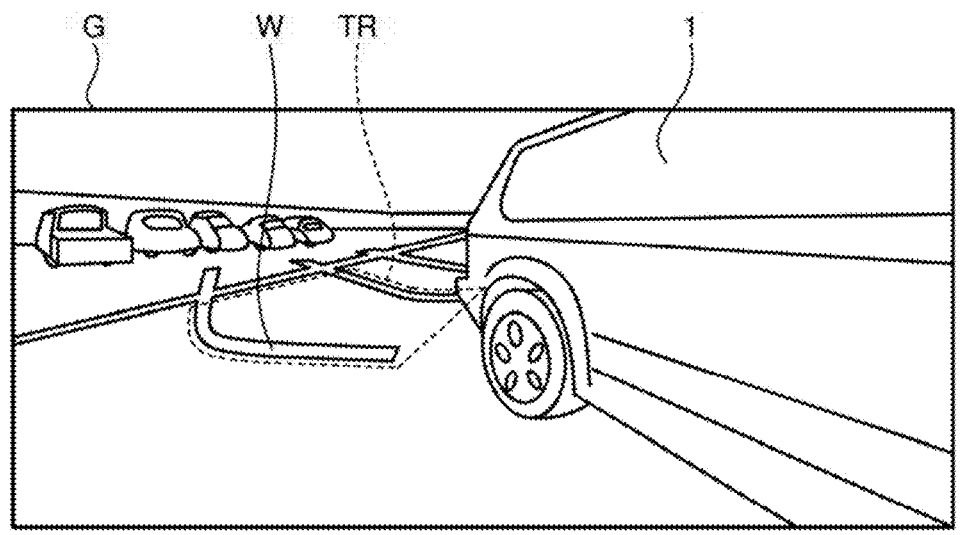
FIG. 8 is a diagram illustrating an exemplary composite image displayed by the ECU included in the vehicle according to the first embodiment.
Figure 9:
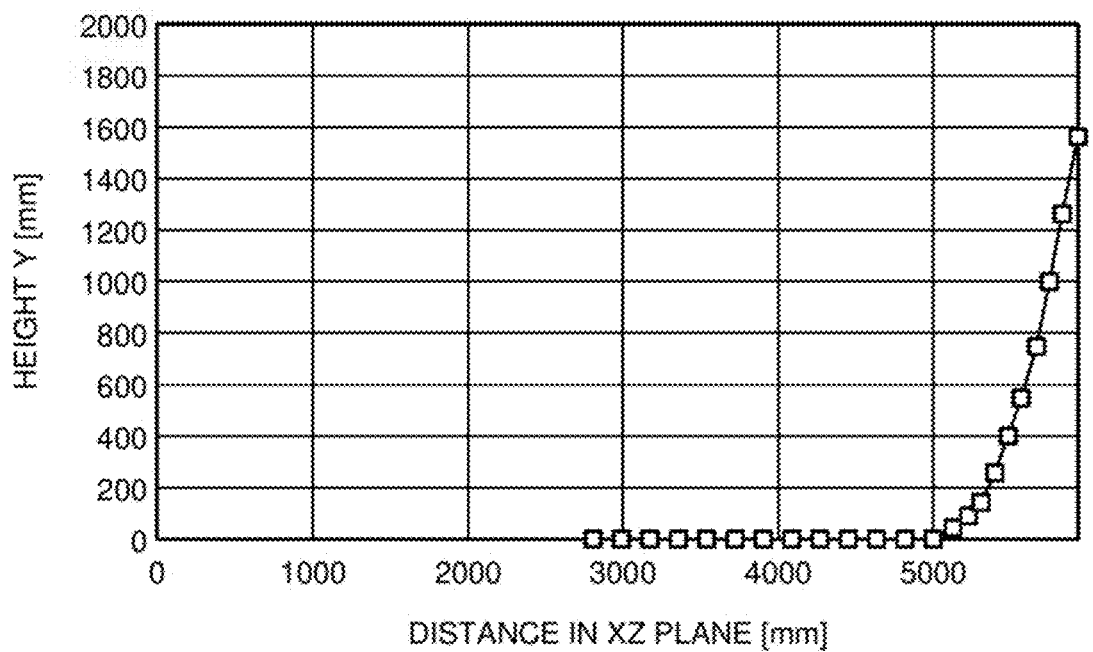
FIG. 9 is an exemplary cross-sectional view of a stereoscopic projection plane to which a taken image is projected by the ECU included in the vehicle according to the first embodiment.
Figure 10:
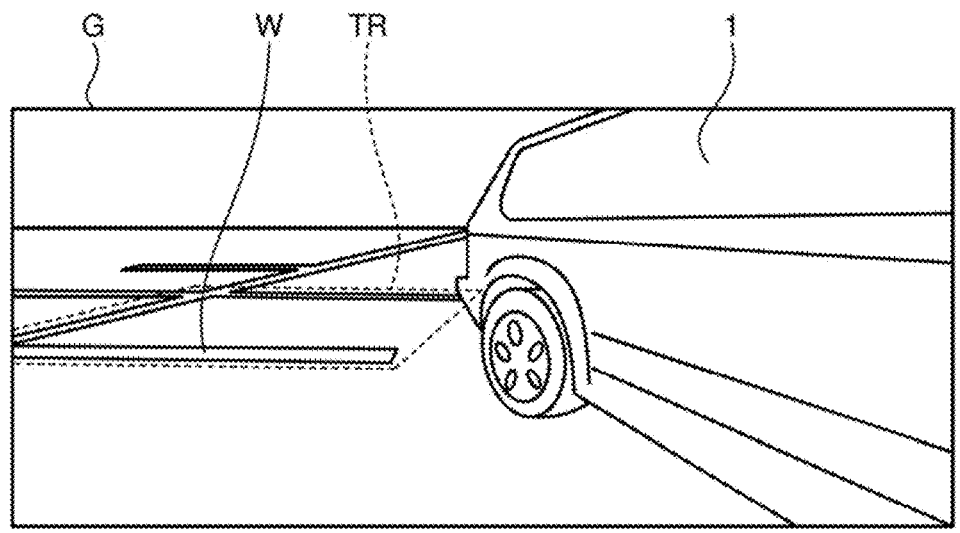
FIG. 10 is a diagram illustrating another exemplary composite image displayed by the ECU included in the vehicle according to the first embodiment.
Figure 11:
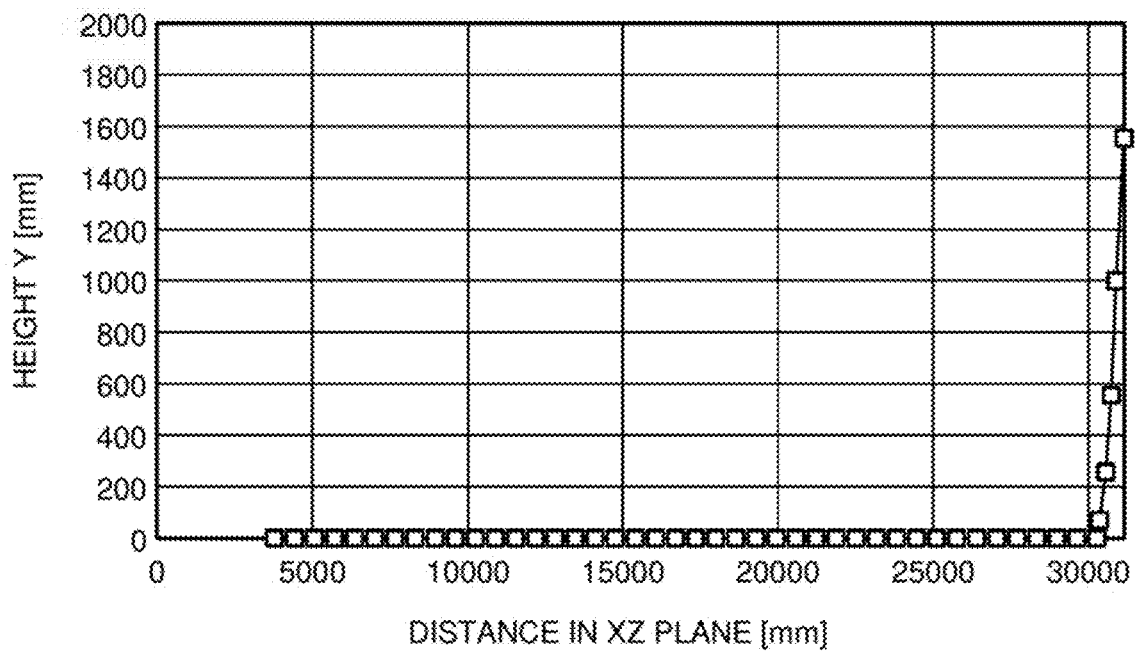
FIG. 11 is another exemplary cross-sectional view of the stereoscopic projection plane to which a taken image is projected by the ECU included in the vehicle according to the first embodiment.
Figure 12:
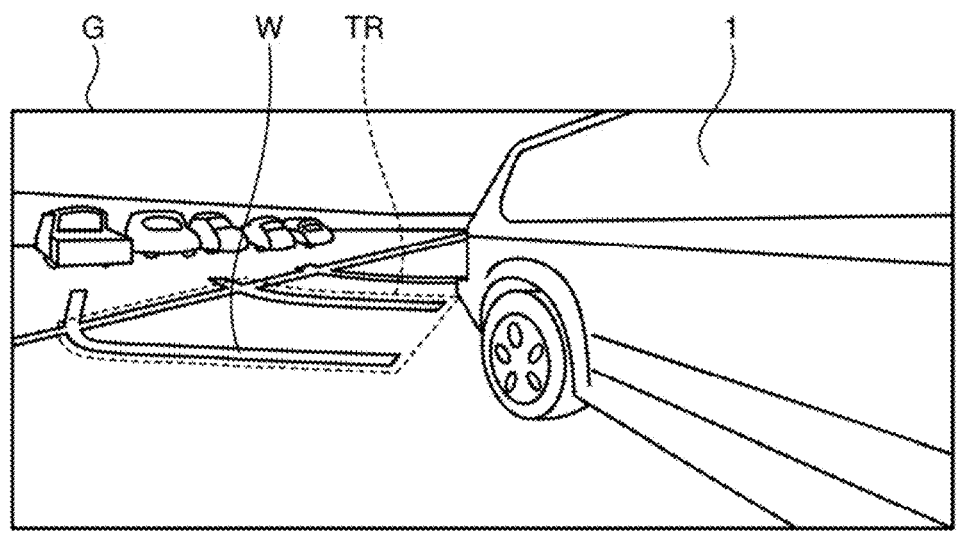
FIG. 12 is a diagram illustrating another exemplary composite image displayed by the ECU included in the vehicle according to the first embodiment.
Figure 13:
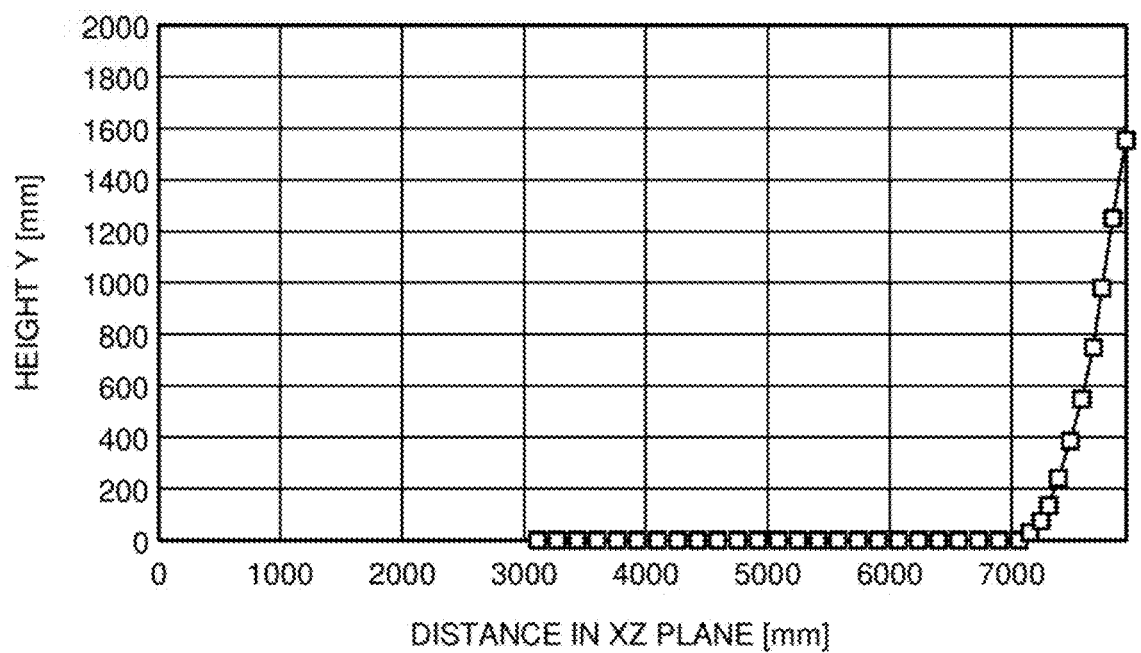
FIG. 13 is another exemplary cross-sectional view of the stereoscopic projection plane to which a taken image is projected by the ECU included in the vehicle according to the first embodiment.

The following describes examples of the composite image displayed by the ECU 14 included in the vehicle 1 according to the embodiment with reference to FIGS. 8 to 13. FIGS. 8, 10, and 12 are diagrams illustrating the examples of the composite image displayed by the ECU included in the vehicle according to the first embodiment. FIGS. 9, 11, and 13 are exemplary cross-sectional views of the stereoscopic projection plane to which the taken image is projected by the ECU included in the vehicle according to the first embodiment. In FIGS. 9, 11, and 13, the abscissa axis represents the distance from the position of the vehicle 1 to each point in the stereoscopic projection plane on the XZ plane parallel to the X direction and the Z direction while the vertical axis represents the height (i.e., the coordinate in the Y direction) of each point in the stereoscopic projection plane.

For example, as illustrated in FIG. 9, the composite image generation unit 403 projects the taken image to the stereoscopic projection plane including a circular planar surface projection region having a radius of 5000 mm with the position of the vehicle 1 as a center and a stereoscopic projection plane rising from the outer edge of the planar surface projection region in the Y direction in a parabolic shape. In this case, the stereoscopic projection plane rises in the Y direction from the front of the target parking region and the taken image of the target parking region is projected to the three-dimensional projection plane. As illustrated in FIG. 8, the target parking region TR (e.g., a parking frame W included in the target parking region TR) included in a composite image G displayed on the display 8 is, thus, distorted, thereby making it impossible to display the composite image G in which the target parking region TR of the vehicle 1 is visually recognized naturally.

As illustrated in FIG. 11, the composite image generation unit 403 projects the taken image to the stereoscopic projection plane including a circular planar surface projection region having a radius of 30000 mm with the position of the vehicle 1 as a center and a stereoscopic projection plane rising from the outer edge of the planar surface projection region in the Y direction in a parabolic shape. In this case, the target parking region is projected to the flat projection plane. The three-dimensional obstacle such as another vehicle present far from the target parking region when viewed from the position of the vehicle 1 is also projected to the flat projection plane. As a result, as illustrated in FIG. 10, the image of the three-dimensional obstacle present far from the target parking region is not included in the composite image G while the target parking region TR (e.g., the parking frame W) included in the composite image G displayed on the display 8 is not distorted, thereby making it impossible to display the composite image G that makes it possible to identify the target parking region TR and the surroundings of the vehicle 1.

As illustrated in FIG. 13, the projection region change unit 406 enlarges the planar surface projection region such that the end on the far side of the target parking region when viewed from the position of the vehicle 1 is included in the planar surface projection region. The composite image generation unit 403 projects the taken image to the stereoscopic projection plane including a circular planar surface projection region having a radius of 7000 mm with the position of the vehicle 1 as a center and a stereoscopic projection plane rising from the outer edge of the planar surface projection region in the Y direction in a parabolic shape. In this case, the target parking region is included in the planar surface projection region in the stereoscopic projection plane and the three-dimensional obstacle present far from the target parking region when viewed from the position of the vehicle 1 is projected to the stereoscopic projection region. As a result, as illustrated in FIG. 12, the target parking region TR included in the composite image G displayed on the display 8 is not distorted and the three-dimensional obstacle present far from the target parking region can be included in the composite image G. The composite image G, thus, can be displayed in which the target parking region TR and the surroundings of the vehicle 1 are visually recognized naturally.

Figure 14:
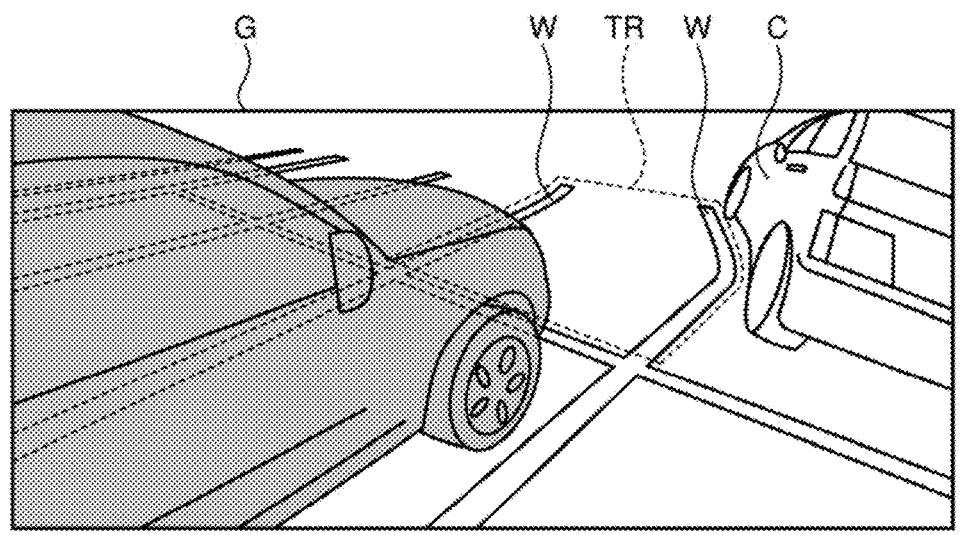
FIG. 14 is a diagram illustrating another exemplary composite image displayed by the ECU included in the vehicle according to the first embodiment.
Figure 15:
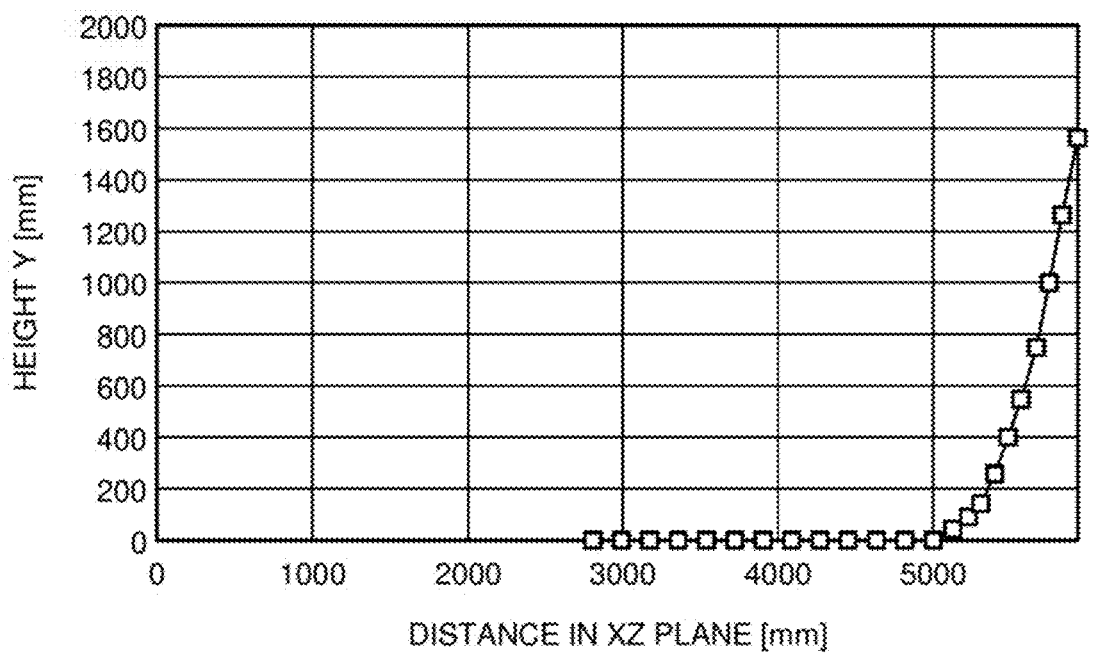
FIG. 15 is another exemplary cross-sectional view of the stereoscopic projection plane to which a taken image is projected by the ECU included in the vehicle according to the first embodiment.
Figure 16:
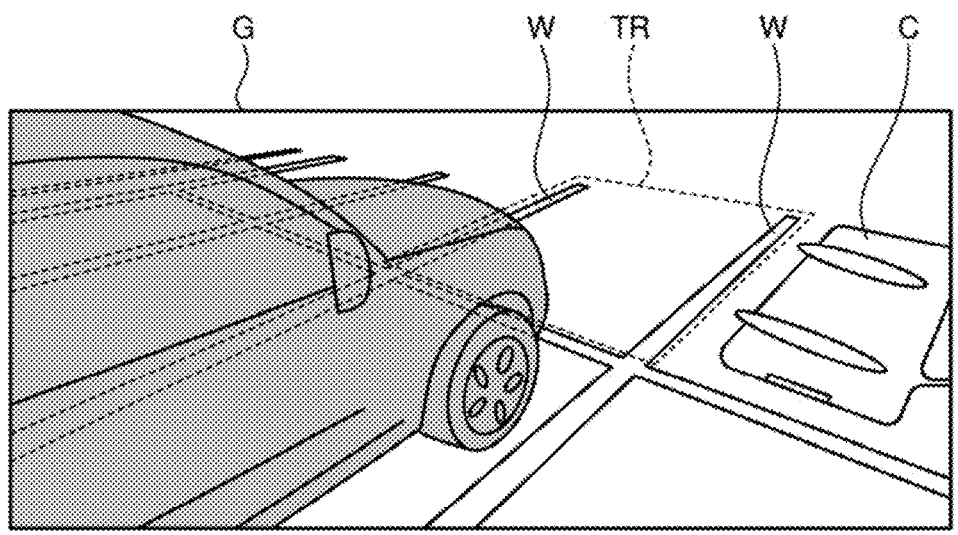
FIG. 16 is a diagram illustrating another exemplary composite image displayed by the ECU included in the vehicle according to the first embodiment.
Figure 17:
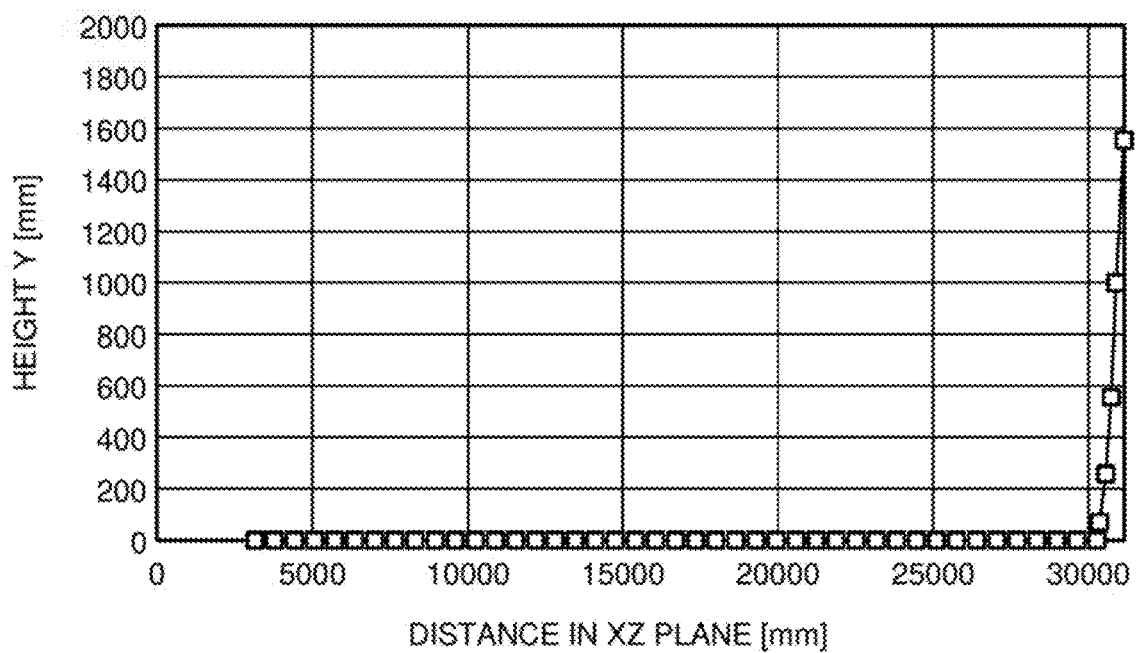
FIG. 17 is another exemplary cross-sectional view of the stereoscopic projection plane to which a taken image is projected by the ECU included in the vehicle according to the first embodiment.
Figure 18:
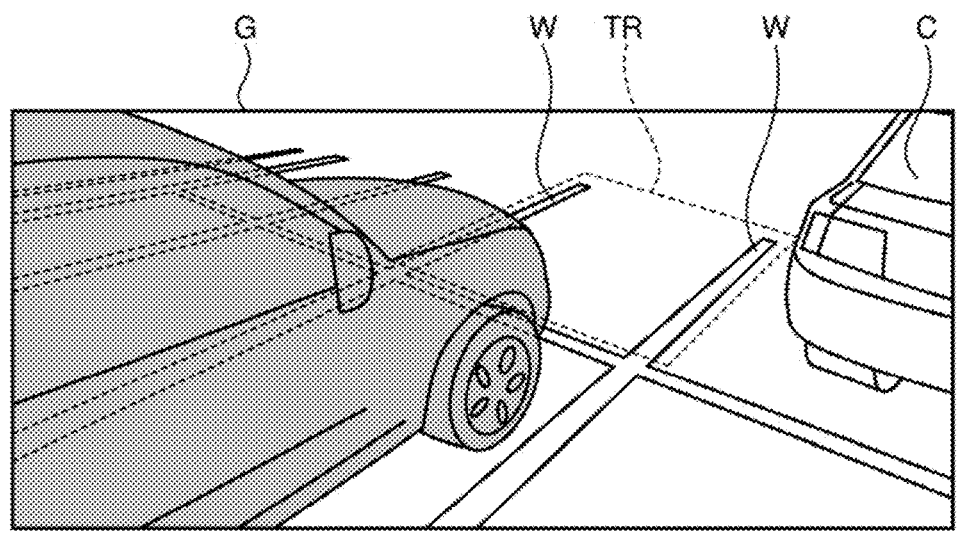
FIG. 18 is a diagram illustrating another exemplary composite image displayed by the ECU included in the vehicle according to the first embodiment.
Figure 19:
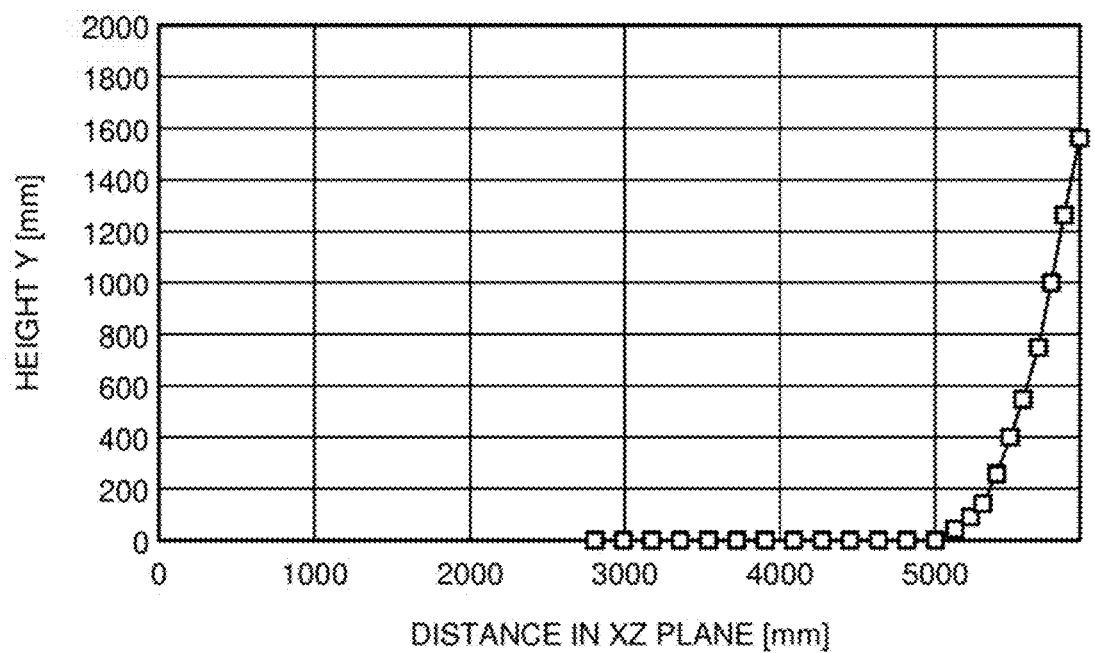
FIG. 19 is another exemplary cross-sectional view of the stereoscopic projection plane to which a taken image is projected by the ECU included in the vehicle according to the first embodiment.

The following describes other examples of the composite image displayed by the ECU 14 included in the vehicle 1 according to the embodiment with reference to FIGS. 14 to 19. FIGS. 14, 16, and 18 are diagrams illustrating the examples of the composite image displayed by the ECU included in the vehicle according to the first embodiment. FIGS. 15, 17, and 19 are exemplary cross-sectional views of the stereoscopic projection plane to which the taken image is projected by the ECU included in the vehicle according to the first embodiment. In FIGS. 15, 17, and 19, the abscissa axis represents the distance from the position of the vehicle 1 to each point in the stereoscopic projection plane on the XZ plane parallel to the X direction and the Z direction while the vertical axis represents the height (i.e., the coordinate in the Y direction) of each point in the stereoscopic projection plane.

For example, as illustrated in FIG. 15, the composite image generation unit 403 projects the taken image to the stereoscopic projection plane including a circular planar surface projection region having a radius of 5000 mm with the position of the vehicle 1 as a center and a stereoscopic projection plane rising from the outer edge of the planar surface projection region in the Y direction in a parabolic shape. In this case, the stereoscopic projection plane rises in the Y direction from the front of the target parking region and the target parking region is projected to the three-dimensional projection plane. As illustrated in FIG. 14, the target parking region TR (e.g., the parking frame W) included in the composite image G displayed on the display 8 is, thus, distorted while another vehicle C present around the target parking region TR is displayed naturally, thereby making it impossible to display the composite image G in which the target parking region TR of the vehicle 1 is visually recognized naturally.

As illustrated in FIG. 17, the composite image generation unit 403 projects the taken image to the stereoscopic projection plane including a circular planar surface projection region having a radius of 30000 mm with the position of the vehicle 1 as a center and a stereoscopic projection plane rising from the outer edge of the planar surface projection region in the Y direction in a parabolic shape. In this case, the target parking region is included in the planar surface projection region in the stereoscopic projection plane and the target parking region is projected to the flat projection plane. The other vehicle present around the target parking region and the three-dimensional obstacle present far from the target parking region TR when viewed from the position of the vehicle 1 are also projected to the flat projection plane. As illustrated in FIG. 16, the images of the other vehicle C present around the target parking region TR and the three-dimensional obstacle present far from the target parking region TR become elongated images while the target parking region TR (e.g., the parking frame W) included in the composite image G displayed on the display 8 is not distorted. The composite image G, thus, cannot be displayed in which the target parking region TR and the surroundings of the vehicle 1 are visually recognized naturally.

As illustrated in FIG. 19, the projection region change unit 406 enlarges the planar surface projection region such that only the target parking region TR in the stereoscopic projection region is included in the planar surface projection region. The composite image generation unit 403 projects the taken image to the stereoscopic projection plane in which the planar surface projection region is enlarged. In this case, the surroundings of the target parking region and the three-dimensional obstacle present far from the target parking region when viewed from the position of the vehicle 1 are projected to the stereoscopic projection region. As a result, as illustrated in FIG. 18, the target parking region TR (e.g., the parking frame W) included in the composite image G displayed on the display 8 is not distorted and the surroundings (e.g., the other vehicle C) of the target parking region TR and the three-dimensional obstacle present far from the target parking region TR can be included in the composite image G. The composite image G, thus, can be displayed in which the target parking region TR and the surroundings of the vehicle 1 are visually recognized naturally.

As described above, the vehicle 1 according to the first embodiment allows the target parking region of the vehicle 1 and the movement path of the vehicle 1 to be projected to the flat projection plane, thereby making it possible to prevent the target parking region (e.g., the parking frame) of the vehicle 1 from being distorted in the stereoscopic projection plane or not being projected to the stereoscopic projection plane. The vehicle 1 according to the first embodiment, thus, can display the composite image in which the target parking region of the vehicle 1 is visually recognized naturally.

Second Embodiment

A second embodiment is an example in which the taken image is projected to the stereoscopic projection plane using a 3D compatible map that associates the coordinates in the stereoscopic projection plane with the texture coordinates of the taken image projected to the coordinates in the stereoscopic projection plane and a 2D map that associates the coordinates in the planar surface projection plane composed of only a single projection plane parallel to the vehicle with the texture coordinates of the taken image projected to the coordinates in the planar surface projection plane. In the following description, description of the same structure as the first embodiment is omitted.

Figure 20:
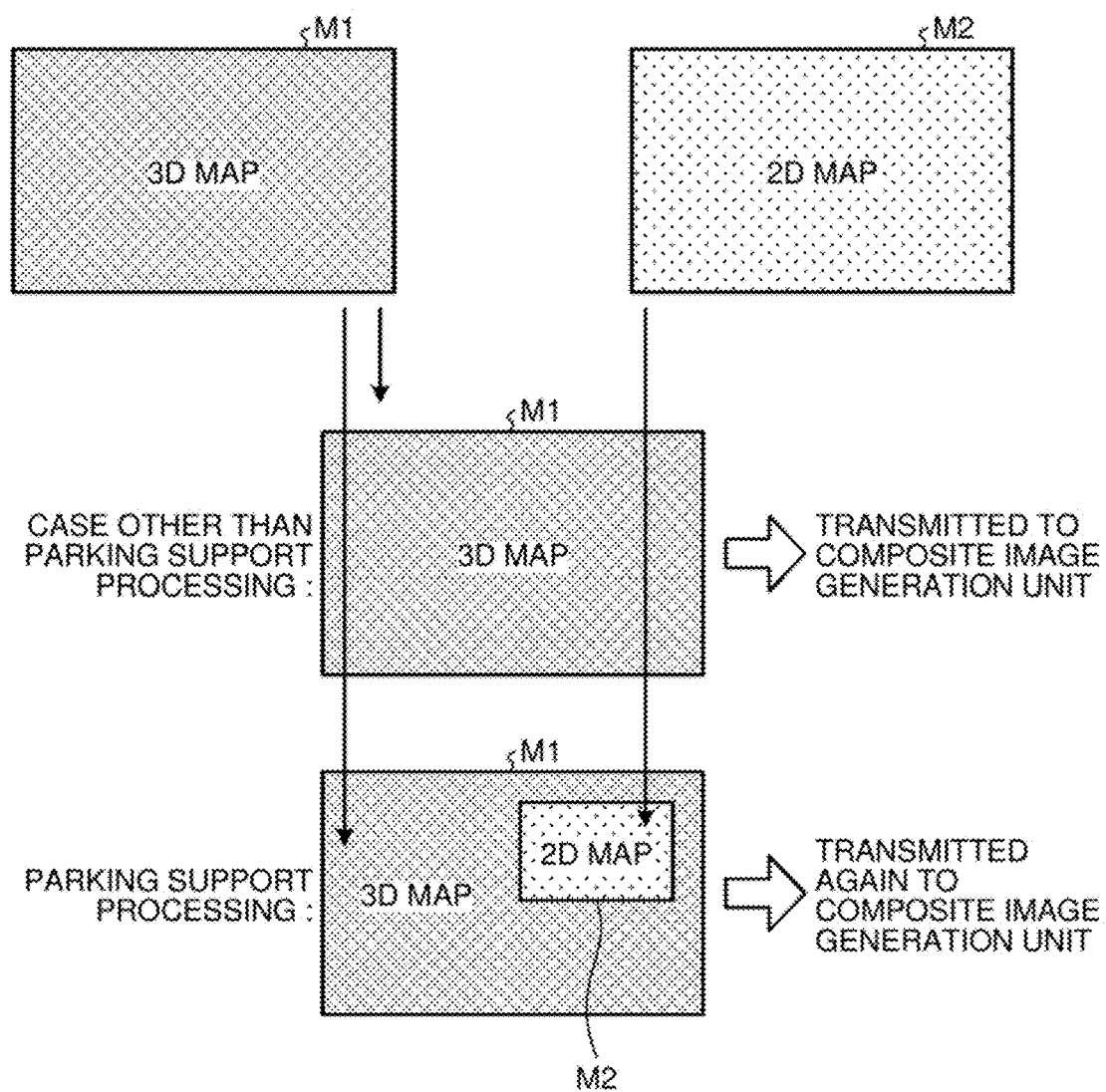
FIG. 20 is a diagram for explaining exemplary projection processing of the taken image by the ECU included in the vehicle according to a second embodiment.

FIG. 20 is a diagram for explaining exemplary projection processing of the taken image by the ECU included in the vehicle according to the second embodiment. In the embodiment, the ROM 14*b* is the storage unit that stores therein a 3D map M1 and a 2D map M2. The 3D map M1 is a map that associates the coordinates in the stereoscopic projection plane with the texture coordinates of the taken image projected to the coordinates in the stereoscopic projection plane. The 2D map M2 is a map that associates the coordinates in the planar surface projection plane composed of only the single projection plane parallel to the vehicle 1 with the texture coordinates of the taken image projected to the coordinates in the planar surface projection plane.

In the embodiment, when the target parking region is decided (i.e., parking support processing of the vehicle 1 is performed), the projection region change unit 406 overwrites a map that associates the coordinates of the movement path in the stereoscopic projection region with the texture coordinates of the taken image projected to the coordinates of the movement path, the map being included in the 3D map M1, on the 2D map M2 that associates the coordinates of the movement path in the flat surface projection plane with the texture coordinates of the taken image projected to the coordinates of the movement path. The projection region change unit 406 transmits the 3D map M1 overwritten on the 2D map M2 to the composite image generation unit 403. In the embodiment, when the target parking region is not decided (i.e., the parking support processing of the vehicle 1 is not performed), the projection region change unit 406 transmits the 3D map M1 stored in the ROM 14b to the composite image generation unit 403 without overwriting the 3D map M1 on the 2D map M2. This makes it unnecessary to calculate the coordinates in the stereoscopic projection plane and the texture coordinates of the taken image projected to the coordinates in the stereoscopic projection plane every time the composite image is displayed. As a result, the display processing of the composite image can be accelerated. Even when the movement path in the stereoscopic projection plane is changed, the 3D map M1 is overwritten on the 2D map M2 and thereafter the 3D map M1 is transmitted to the composite image generation unit 403, thereby making it unnecessary to recalculate the coordinates in the stereoscopic projection plane and the texture coordinates of the taken image projected to the coordinates in the stereoscopic projection plane. As a result, the display processing of the composite image can be more accelerated.

In the embodiment, the composite image generation unit 403 projects the taken image acquired by the image acquisition unit 402 to the stereoscopic projection plane in accordance with the 3D map M1 received from the projection region change unit 406. Specifically, the composite image generation unit 403 identifies, for each pixel included in the taken image, the coordinates in the stereoscopic projection plane associated with the texture coordinates of the pixel in the 3D map M1. The composite image generation unit 403 projects the taken image to the stereoscopic projection plane by projecting the pixel to the position at the identified coordinates in the stereoscopic projection plane.

As described above, the vehicle 1 according to the second embodiment makes it unnecessary to calculate the coordinates in the stereoscopic projection plane and the texture coordinates of the taken image projected to the coordinates in the stereoscopic projection plane every time the composite image is displayed. The vehicle 1 according to the second embodiment, thus, can accelerate the display processing of the composite image.

The invention claimed is:

1. An image processing device, comprising:
a processor configured to:
  acquire a taken image obtained by imaging surroundings of a vehicle by an imaging unit mounted on the vehicle;
  project the taken image to a stereoscopic projection plane including the vehicle and a first projection region rising above the vehicle;
  produce a composite image of the stereoscopic projection plane when viewed from a virtual viewpoint;
  cause a display to display the composite image;
  determine a target parking region in which the vehicle is parked in the stereoscopic projection plane; and
  shift at least a part of a movement path of the vehicle from a position of the vehicle to the target parking region and the target parking region of the vehicle to a second projection region horizontal to the vehicle,
  wherein the processor partially enlarges the second projection region such that only at least a part of the target parking region and the movement path in the first projection region is included in the second projection region.

2. The image processing device according to claim 1, wherein the first projection region is positioned around the second projection region, the second projection region includes the vehicle, and
  the processor enlarges the second projection region as a whole such that an end on a far side of the target parking region when viewed from the position of the vehicle is included in the second projection region.

3. An image processing device, comprising:
a processor configured to:
  acquire a taken image obtained by imaging surroundings of a vehicle by an imaging unit mounted on the vehicle;
  project the taken image to a stereoscopic projection plane including the vehicle and a first projection region rising above the vehicle;
  produce a composite image of the stereoscopic projection plane when viewed from a virtual viewpoint;
  cause a display to display the composite image;
  determine a target parking region in which the vehicle is parked in the stereoscopic projection plane; and
  shift at least a part of a movement path of the vehicle from a position of the vehicle to the target parking region and the target parking region of the vehicle to a second projection region horizontal to the vehicle, wherein
the first projection region is positioned around the second projection region,
the second projection region includes the vehicle, and
the processor enlarges the second projection region such that an end on a far side of the target parking region when viewed from the position of the vehicle is included in the second projection region when an obstacle is absent around the target parking region, and partially enlarges the second projection region such that only a part of the target parking region and the movement path in the first projection region is included in the second projection region when an obstacle is present around the target parking region.

4. An image processing device, comprising:
a processor configured to:
  acquire a taken image obtained by imaging surroundings of a vehicle by an imaging unit mounted on the vehicle;
  project the taken image to a stereoscopic projection plane including the vehicle and a first projection region rising above the vehicle;
  produce a composite image of the stereoscopic projection plane when viewed from a virtual viewpoint;
  cause a display to display the composite image;
  determine a target parking region in which the vehicle is parked in the stereoscopic projection plane;
  shift at least a part of a movement path of the vehicle from a position of the vehicle to the target parking region and the target parking region of the vehicle to a second projection region horizontal to the vehicle; and
a memory that stores therein a first map associating coordinates in the stereoscopic projection plane with texture coordinates of the taken image projected to the coordinates and a second map associating coordinates in a planar surface projection plane, the planar surface projection plane being composed of a single projection plane horizontal to the vehicle, with the texture coordinates projected to the coordinates,
wherein the processor, when the target parking region is decided, overwrites a map associating coordinates of the movement path in the second projection region with the texture coordinates of the taken image projected to the coordinates, the map being included in the first map, with the second map associating coordinates of the movement path in the planar surface projection plane with the texture coordinates of the taken image projected to the coordinates, and projects the taken image to the stereoscopic projection plane in accordance with the first map.

* * * * *